(12) United States Patent
Kelaiditis et al.

(10) Patent No.: US 9,309,865 B2
(45) Date of Patent: Apr. 12, 2016

(54) DEVICE FOR USING FLOW ENERGY

(75) Inventors: Konstantin Kelaiditis, St. Ingbert (DE);
Nikolas Kelaiditis, Frankfurt a.M. (DE);
Alexis Kelaiditis, St. Ingbert (DE)

(73) Assignee: ITEA ECOTECH GMBH, St. Ingbert (DE)

( * ) Notice: Subject to any disclaimer, the term of this patent is extended or adjusted under 35 U.S.C. 154(b) by 380 days.

(21) Appl. No.: 13/518,451

(22) PCT Filed: Dec. 19, 2010

(86) PCT No.: PCT/DE2010/001515
§ 371 (c)(1),
(2), (4) Date: Jun. 22, 2012

(87) PCT Pub. No.: WO2011/076195
PCT Pub. Date: Jun. 30, 2011

(65) Prior Publication Data
US 2012/0274076 A1    Nov. 1, 2012

(30) Foreign Application Priority Data

Dec. 22, 2009 (DE) .......................... 10 2009 060 437

(51) Int. Cl.
*F03D 9/00*     (2006.01)
*H02P 9/04*     (2006.01)
(Continued)

(52) U.S. Cl.
CPC    *F03D 5/04* (2013.01); *F03D 3/062* (2013.01);
*F05B 2220/7068* (2013.01); *F05B 2240/211*
(2013.01); *F05B 2260/4031* (2013.01); *Y02E 10/70* (2013.01); *Y02E 10/74* (2013.01)

(58) Field of Classification Search
CPC ... F03D 3/062; F03D 5/04; F05B 2220/7068;
F05B 2240/211; F05B 2260/4031; Y02E 10/70; Y02E 10/74

USPC .......................................... 290/43, 44, 54, 55
See application file for complete search history.

(56) References Cited

U.S. PATENT DOCUMENTS

| 1,518,022 | A | 12/1924 | Twiford |
| 2,097,667 | A | 11/1937 | Johnson |

(Continued)

FOREIGN PATENT DOCUMENTS

| DE | 102009025289 | 12/2009 |
| EP | 1544459 | 8/2005 |
| WO | 2007118462 | 10/2007 |

OTHER PUBLICATIONS

Machine translation of WO2007/118462 obtained via Espacenet, Jan. 2015.*

*Primary Examiner* — Tulsidas C Patel
*Assistant Examiner* — Thomas Quigley
(74) *Attorney, Agent, or Firm* — Lucas & Mercanti, LLP; Klaus P. Stoffel

(57) ABSTRACT

The invention relates to a device for using flow energy, in particular wind energy, comprising elements (2) that have incident-flow surfaces (1) and that are guided so as to circulate on a track at a distance to each other, wherein a rotational axis about which the elements (2) move is arranged perpendicularly to the flow direction, and comprising an apparatus (5) for transmitting the flow energy captured using the elements (2) to a generator (15). According to the invention, the apparatus (5) and the elements (2) are connected to each other in such a way that forces acting tangentially to the track (3) are transmitted and forces acting in other directions are not transmitted or are transmitted only in an attenuated manner.

13 Claims, 5 Drawing Sheets

(51) Int. Cl.
   *F03D 5/04*     (2006.01)
   *F03D 3/06*     (2006.01)

(56) References Cited

U.S. PATENT DOCUMENTS

| | | | |
|---|---|---|---|
| 4,052,134 A | 10/1977 | Rumsey | |
| 4,178,126 A | 12/1979 | Weed | |
| 7,048,506 B2 * | 5/2006 | Atmur et al. | 416/30 |
| 8,192,140 B2 | 6/2012 | Kelaiditis et al. | |
| 2005/0269822 A1 * | 12/2005 | Kinpara | F03D 3/005 290/40 C |
| 2011/0018280 A1 * | 1/2011 | Mahaffy | F03D 3/005 290/55 |

* cited by examiner

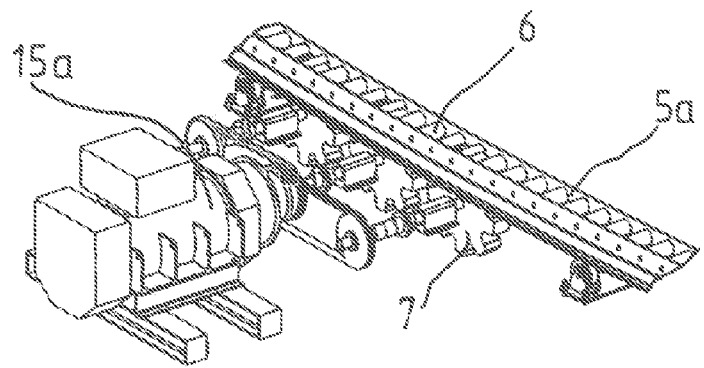
Fig. 8
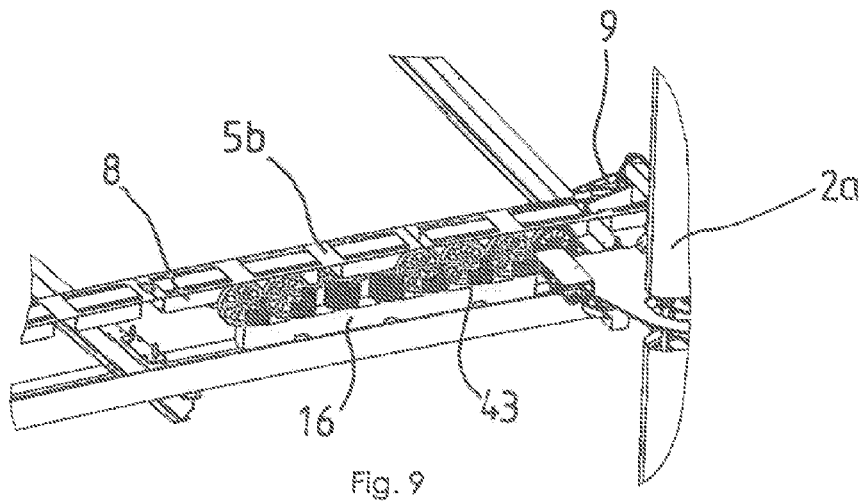
Fig. 9
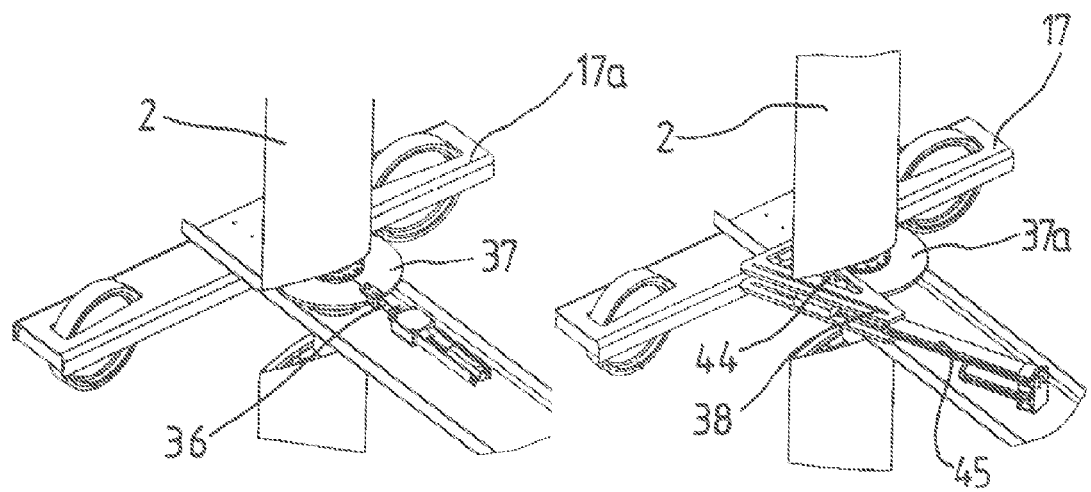
Fig. 10
Fig. 11

DEVICE FOR USING FLOW ENERGY

The present application is a 371 of International application PCT/DE2010/001515, filed Dec. 19, 2010, which claims priority of DE 10 2009 060 437.5, filed Dec. 22, 2009, the priority of these applications is hereby claimed and these applications are incorporated herein by reference.

BACKGROUND OF THE INVENTION

The invention relates to a device for utilizing flow energy, particularly wind energy, with elements provided with impinged-upon surfaces, wherein the elements circulate on a track and are guided at a distance relative to each other, wherein an axis of rotation around which the elements move is arranged transversely of the flow direction, and comprising a device for transmitting the flow energy picked up by the elements to a generator Such a device is known from WO 2007/118462 A1. The elements are moved parallel relative to each other and, contrary to a conventional wind wheel, are not arranged in a plane perpendicularly of the flow direction. They are fastened on a circular support constructed as a gear wheel by means of which the picked-up flow energy is transmitted to the generator. Since especially in the case of high flow velocities and devices having large dimensions with a gear wheel diameter of >50 m, strong forces and possibly strong vibrations occur, high requirements are made with respect to the mechanical stability of the devices. A guidance of the elements sufficiently precise for transmitting the energy of movement at a generator can only be achieved at great structural expense.

SUMMARY OF THE INVENTION

The invention is based on the object to facilitate a utilization of the flow energy while being of simple construction and which is less dependent on the weather conditions.

The object is met in that the elements and the device are connected to each other in such a way that forces acting in a direction tangentially of the track are transmitted and, forces acting in other directions are not transmitted or are only transmitted to a weakened extent.

Weight forces of the elements and horizontal forces caused by the flow and acting on the elements are uncoupled from the device and any vibrations are transmitted only to a small extent to the device. In comparison to known devices, this apparatus can be operated at even higher flow velocities.

Since only the forces to be converted into electrical energy i.e., the forces acting in the direction of rotation must be transmitted through the device to the generator, the generator does not have to be rated for loads caused by other force components.

The device additionally connects the elements to each other. If one of the elements is in a position in which it is not driven by the flow, it is pulled along by means of the device by the other elements.

In one embodiment of the invention the elements and the device are mounted separate from each other, and the device is preferably mounted parallel to the track.

It is useful if the connection is releasable, so that in the case of the assembly or repair of the device, the device can be uncoupled from the elements and then coupled back to the elements. Advantageously, the device is provided with a coupling element which has a seat for a preferably foldable member which forms the connection and is arranged at a bearing of the elements. In directions perpendicular of the direction of movement of the elements, the member can slide in the seat.

In a further development of the invention, the device for force transmission is provided on a gear wheel of a rack of a gear unit of a generator, or directly on the generator. Advantageously, for this purpose, the device is provided with teeth or is provided for receiving the teeth of a gear wheel or a rack. Moreover, the device can be provided with blocks of ferromagnetic material, preferably iron, which are arranged at a distance from each other and interact with a generator known, for example, from DE 10 2009 025 289 A1.

In a further development of the invention, the elements and/or the device are supported preferably on rollers which are guided on rails, or on water.

Advantageously, the aforementioned connection is formed between the bearing of the elements and the device.

For supporting the elements, a rail is provided which is arranged on a scaffold. The scaffold absorbs through the rail the forces which do not act in the direction of rotation, particularly the weight forces, and the forces acting horizontally through the wind acting against the elements.

In a further development of the invention, for each element a separate support is provided, preferably a carriage traveling on rails and provided with at least two wheels.

Advantageously, in comparison to the devices known from the prior art in which all elements are fastened together on a ring, the support can be constructed so as to be more compact.

In an embodiment of the invention, the carriages are elastically connected to each other. Accordingly, the transmission of vibrations between the carriages and correspondingly between the elements, can be lowered.

While it would be conceivable to support the elements approximately in their middle along their length, in a preferred embodiment of the invention, the elements are supported at their underside and possibly additionally at their upper site and/or approximately in their middle. As a supplement or alternative, the elements can also be supported at other locations.

Advantageously, the elements which may be longer than 15 m, preferably longer than 25 m, and/or the device whose circular arc may have a length >100 m, preferably a length >300 m, are of modular construction. The transportation of individual parts, particularly the elements to the location where the device is to be installed, is simplified because special transports for large parts are no longer necessary. Even large plants can be transported at relatively lower cost to almost any location which can be reached by vehicle.

Advantageously, the elements are formed of at least two element parts arranged lengthwise one above the other, wherein a connection between the element parts is provided in such a way that the element parts can be tilted toward each other for compensating structural tolerances or thermal expansions of the element parts as well as of the device as a whole by at most 2° in relation to their longitudinal axis.

In the following, the invention will be explained in more detail in connection with embodiments and the enclosed drawings which refer to these embodiments. Shown in isometric illustrations,

BRIEF DESCRIPTION OF THE DRAWING

FIG. 8 shows a detail of another device according to the invention,
FIG. 9 shows a detail of a further device according to the invention,
FIG. 10 shows an embodiment of a part of the device according to the invention,
FIG. 11 shows another embodiment of the part according to FIG. 10.

DETAILED DESCRIPTION OF THE INVENTION

Figure 1:
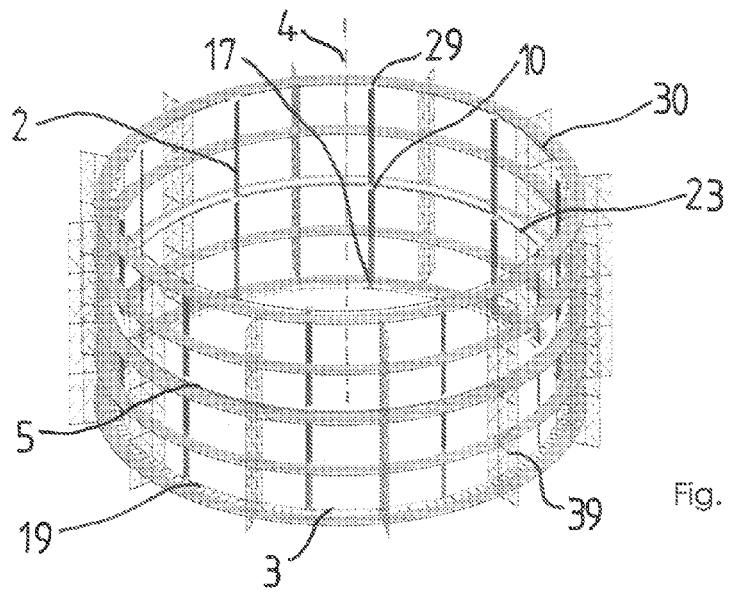
FIG. 1 shows a device according to the invention.

A device according to the invention according to FIG. 1 includes ten elements 2 with impinged-upon surfaces 1 for picking up wind energy, which elements are arranged on circular rails 19, 23, 30 parallel offset relative to each other along a track 3 so as to be rotatable about an axis 4 shown by a broken line. The device is provided with a scaffold 39 which absorbs the forces transmitted by the elements to rails 19, 23, 30.

The elements 2 which have a total length of 50 m are of modular construction and composed of four parts, each having a length of 12.5 m, and are arranged lengthwise one above the other.

Figure 2:
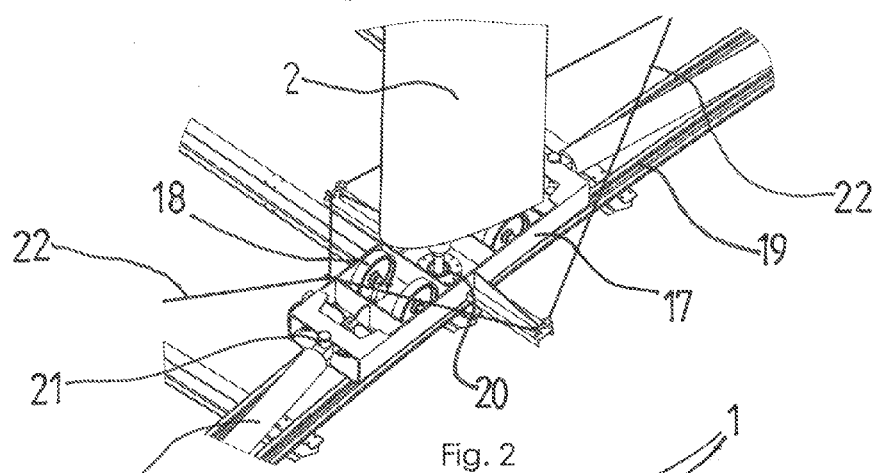
FIG. 2 shows a detail of the device of FIG. 1.

As shown in FIG. 2, the elements 2 are rotatably supported in a ball head bearing 20 on a carriage 17 arranged on the rails 19. The carriage 17 has four rollers 18, wherein always two of the rollers travel on one of the two rails 19. In addition, ropes 22 are fastened to the carriage 17 which are connected with a middle or upper support of the elements 2 (not shown here).

Rods 40 are fastened to joints 21 of the carriage 17, wherein the rods have certain elasticity, and form a horizontal connection to adjacent carriages 17.

Figure 3:
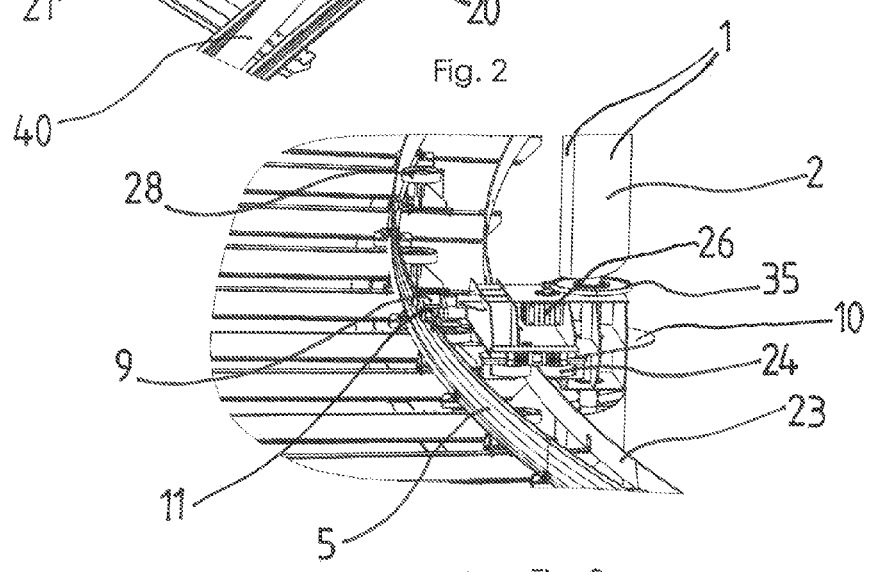
FIG. 3 shows an additional detail of the device of FIG. 1.

In FIG. 3 is shown how the elements 2 are supported at the middle thereof. For guiding the elements 2, a rail 23 is provided which serves for horizontally supporting the elements 2 by means of rollers 24 attached to a support 10. The support 10 is connected through a connecting member 9 to a ring 5 which is movable parallel to the rail 23 and is provided on its outer side with teeth, not illustrated here, for transmitting the rotational movement of the elements 2 caused by the wind to a generator 15. The ring 5 is guided horizontally by rollers 28 and vertically, as can be seen especially in FIG. 4, by rollers 27.

The ring 5 is made of an aluminum sheet on which a toothed belt is arranged.

Figure 4:
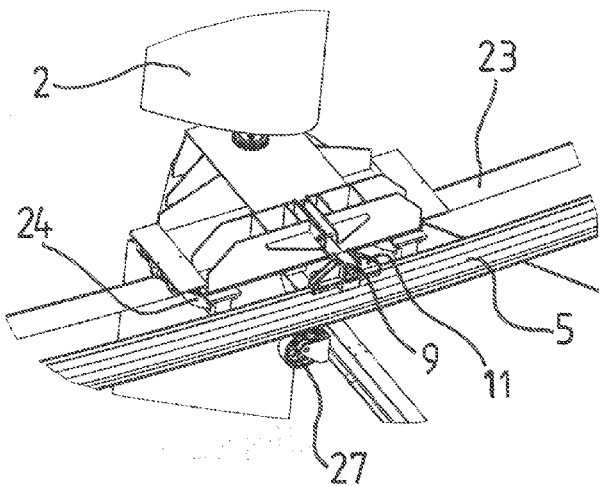
FIG. 4 shows the detail of FIG. 3 in a different view.

The connecting element 9, seen in more detail in FIG. 4, engages in a seat provided in a coupling element 11 seated on the ring 5, wherein the coupling element 11 can slide in the radial direction but transmits any forces generated in the direction of movement of the elements. The elements 2 can be uncoupled from the ring 5 by folding the connecting element 9 out of the coupling element 11.

Figure 5:
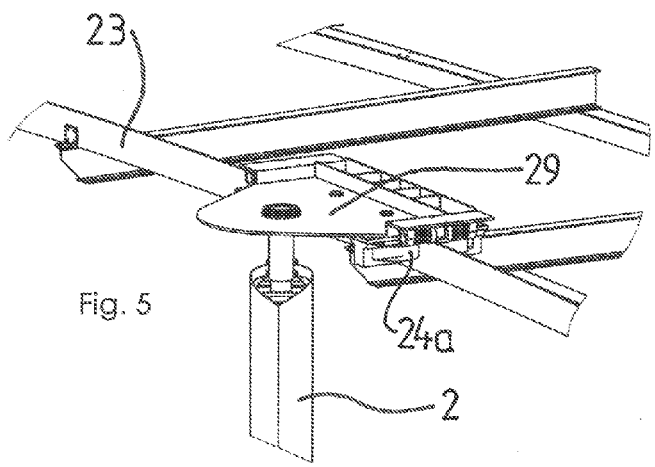
FIG. 5 shows another detail of the device of FIG. 1.

FIG. 5 shows the upper support 29 of the elements which forms, essentially in the same manner as the support in the middle, a support in the horizontal direction with rollers 24a on the rail 30.

Figure 6:
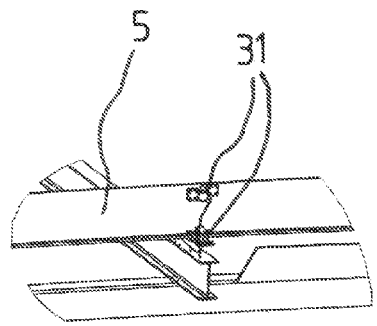
FIG. 6 shows another detail of the device of FIG. 1.

As can be seen particularly from FIG. 6, the ring 5 is formed of a plurality of individual partial pieces which can be connected to each other at joints 31.

Figure 7:
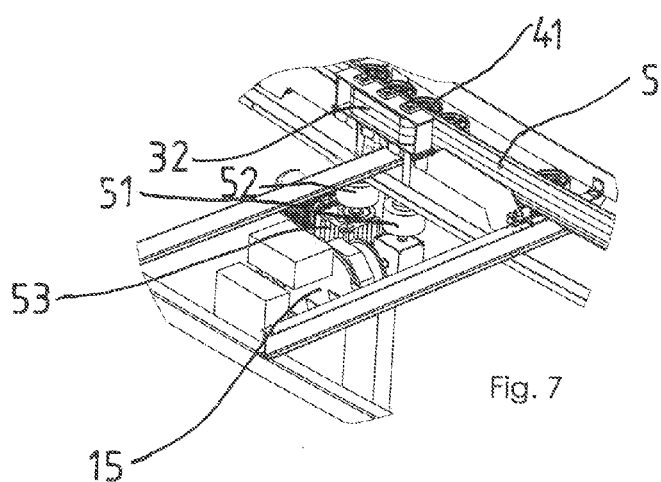
FIG. 7 shows another detail of the device of FIG. 1.

FIG. 7 shows how the ring 5 transmits the movement produced with the elements 2 to a generator 15. The ring 5 is pressed by means of rollers 41 against an endless belt 32 guided around two cylinders wherein, the belt is provided on its outer side with teeth, not shown here, which engage the teeth of the ring 5. The movement of a cylinder rotated in this manner is transmitted through a shaft to a generator 15. At the bottom side of the shaft, a coupling 51 is provided which has a position in which the torque of the shaft is transmitted to the generator 15, and a different position in which no force is transmitted.

The belt 32 is connected via the other cylinder through another shaft and a coupling 52 to a motor 53 by means of which the ring 5 can be driven and, in this manner, the ring and the elements can be brought into a certain position, for example for repair operations.

When operating the device, the motor 53 is uncoupled and the movement of the ring is transmitted through the coupling 51 to the generator. Analogously, for moving the ring with the motor 53, the coupling 51 is adjusted in such a way that no force is transmitted.

Reference will now be made to FIGS. 8 to 13 in which equal or equivalent parts are provided with the same reference numeral as those in FIGS. 1 to 7 and to the respective reference numeral a letter has been added.

In the embodiment illustrated in FIG. 8, for transmitting the movement energy of the elements 2a, a ring 5a is configured as a chain of a chain gear unit. It is provided with several links 6 arranged at a distance from each other, wherein the links 6 interact with the gear wheels 7. When the ring 5a is moved, the gear wheels 7 are rotated and drive a generator 15a.

In the embodiment according to FIG. 9, iron blocks 8 are arranged at a distance from each other and on a ring 5b for transmitting the movement energy, wherein the iron blocks are guided by a generator 16 known from DE 10 2009 025 298 A1. When the iron blocks 8 are moved over coils of the generator 16, a voltage is induced at the coil because of the permeability of the space at the coil which changes over time.

Reference will now be made to FIGS. 3, 10 and 11 in which various devices for aligning the elements 2 are illustrated. The device according to FIG. 3 includes a gear wheel 35 which engages in another gear wheel provided with an electric motor 26. By rotating the gear wheel connected to the electric motor, the elements 2 can be rotated about its longitudinal axis.

In the embodiment illustrated in FIG. 10, the elements 2 are each connected to a plate 37 which has a lateral recess in which a support is fastened. The support is provided with a rope or a leaf spring 36. By means of an electric motor, the possible radius of movement of the plate 37 can be adjusted and, thus, a possible pivoting radius of the elements 2 can be adjusted. Depending on the wind direction acting on the elements 2, the elements 2 can be pivoted in positions to the left and to the right of the support 36.

By means of a control device 38 illustrated in FIG. 11, a position of the elements 2 can be exactly controlled. A protrusion 44 engaging in a recess in a plate 37a is mounted so as to be slidable along a rod 35. By displacing the protrusion 44 on the rod 45, the plate 37a, together with the elements 2, are rotated.

Figure 12:
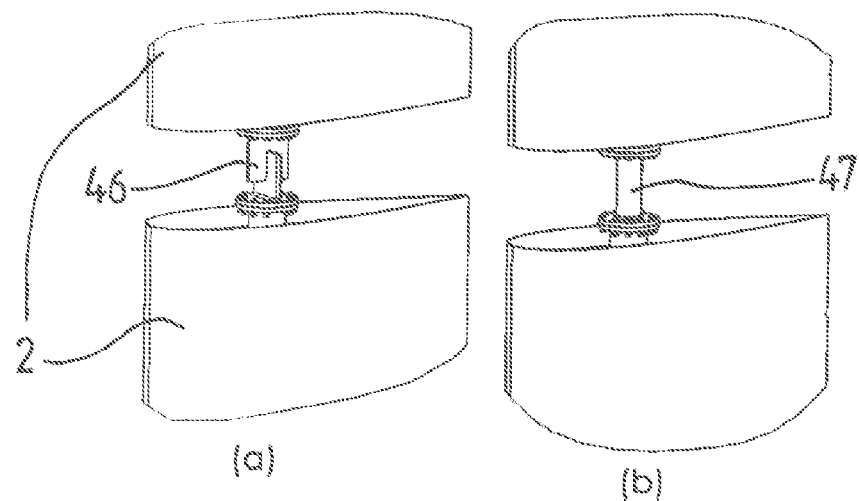
FIG. 12 shows details of a part of the device according to the invention.
Figure 12:
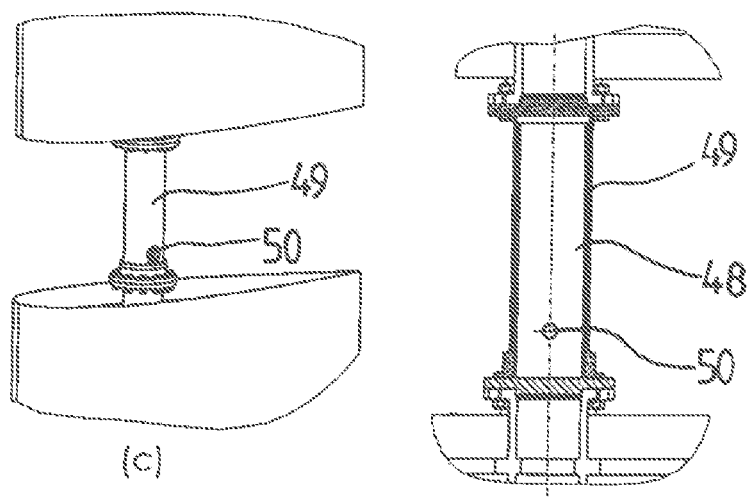

FIG. 12 shows connections of parts of the elements 2 of modular construction which permit tilting of the elements relative to each other by at most 1°. In the example according to FIG. 12a, two sheet metal pieces 46 provided with slots engage into each other. FIG. 11b shows a rod 47 of an elastically deformable synthetic material.

As can be seen particularly in FIGS. 12c and 12d, the elements 2 can also be connected to each other through pipes 48 and 49 which can be pushed into each other. They are secured against rotation and displacement in an axial direction by a protrusion 50 projecting into a recess in the outer pipe 49.

During operation of the device, the elements 2 are put in motion under the influence of wind and they travel along the rails 19, 23 and 30 on a circular track.

The alignment of the elements 2 in relation to the wind direction and in dependence on their respective positions can be adjusted by means of the control devices 35, 36 or 38. The alignment can be controlled by means of a computer program in dependence on the wind direction and the wind speed.

During their movement along the rails 19, 23 and 30, the elements 2 take along the ring 5. For this purpose, they are each connected to the ring 5 through the connecting member 9 which only transmits forces in a tangential direction relative to the ring 5 and is otherwise, particularly in the radial and vertical directions, displaceable with negligible force transmission in the coupling element 10. Accordingly, only forces in the direction of rotation of the elements 2 are transmitted to the ring 5. Any forces which occur during operation of the device, particularly also forces caused by vibrations which do not act in the direction of rotation, are absorbed by the rails 19, 23 and 30 or by the support scaffold on which the rails 29, 23 and 30 are fastened, are not transmitted to the ring 5 or are transmitted to the ring 5 only to a small extent.

The movement of the ring 5 is transmitted, in accordance with FIG. 7 or 8 by the gear wheels to the generators 15, 15a and are there transformed into electrical energy or are conducted by means of the iron blocks 8 via the generators 16 and there, as is known from DE 10 2009 025 298 A1, electrical voltage is induced.

Figure 13:
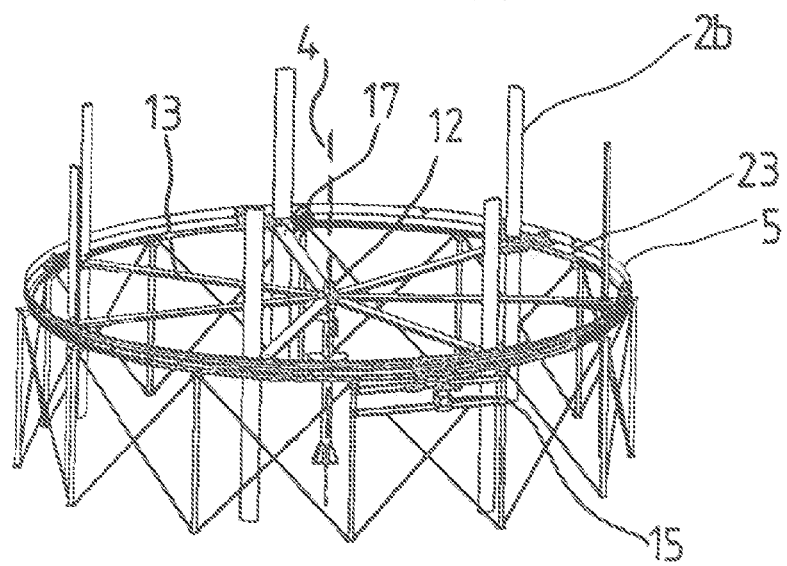
FIG. 13 shows another device according to the invention.

As is apparent particularly from FIG. 13, the elements 2 can also be stored lengthwise in the middle of carriages 17. The carriages 17 are rotatably mounted by means of radially aligned rods 13 on a pole arranged in an axis of rotation of the pole 12 arranged in an axis of rotation of the rotary movement of the elements 2. The transmission to a generator 15a takes place in accordance with the embodiment illustrated in FIG. 8. Alternatively, the movement of the elements 2 could be picked up by means of a generator arranged on the pole 12 to which the movement of the elements 2 is transmitted through the rods 13.

In another embodiment, not illustrated, a rail 23a, in comparison to the embodiment of FIG. 12, could also be offset further inwardly, particularly at a center of gravity of the elements 2 and the rods 13.

Figure 14:
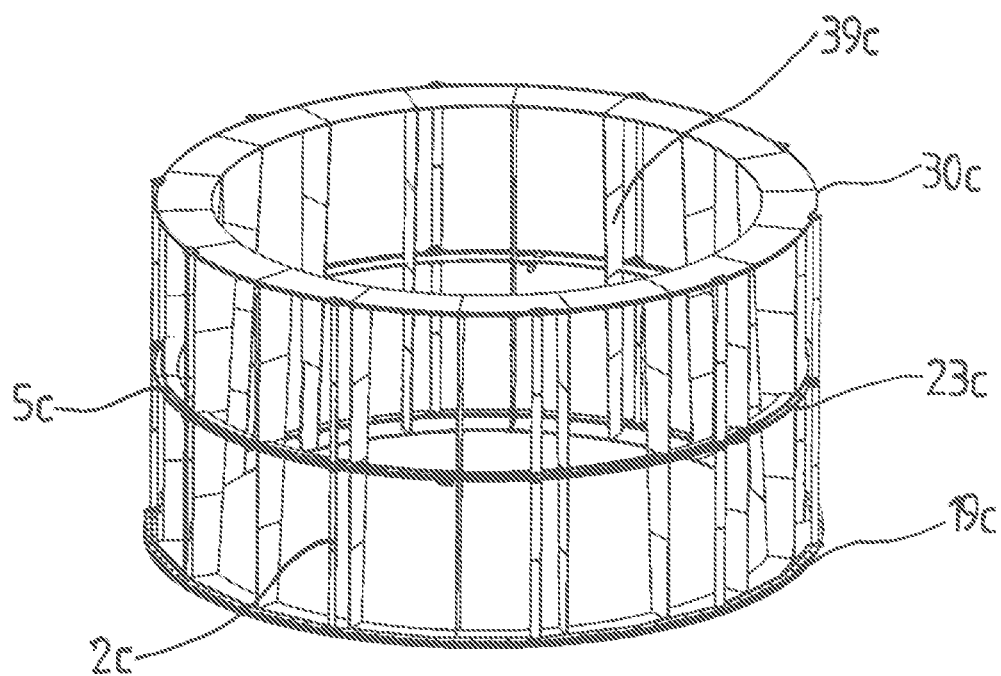
FIG. 14 shows another device according to the invention.

FIG. 14 shows another device according to the invention in which the elements 2c as well as rails 19a, 23a and 30a, and a ring 5c are arranged on an outer side of a scaffold 39c. In this embodiment, the scaffold 39c is arranged on the side of the device facing the wind, not in front of the elements 2c as seen in the wind direction. Accordingly, turbulence of the wind prior to impinging on the elements 2c is completely eliminated.

It is further conceivable to arrange several of the devices one above the other as illustrated in FIGS. 1, 13 and 14, as described above. In this manner, a tower is formed with several groups of rotating elements, devices and appropriate supports, wherein the produced current can be picked up separately by one of them.

The invention claimed is:

1. A device for utilizing flow energy, comprising: a track; elements, having impingement surfaces, traveling along the track and guided at a distance from each other, wherein an axis of rotation around which the elements move, is arranged transversely of a flow direction;

and a ring that is movable parallel to the track whereby forces that act in a direction tangential to the track are transferred and the flow energy picked up by the elements is transmitted to a generator, wherein the elements and the ring are mounted separately from each other in the device and the elements and the ring are connected to each other so that the forces acting between the elements and the ring tangentially relative to the track are transmitted and forces acting in directions other than the tangential direction are not transmitted to the ring or are transmitted only to a weakened extent.

2. The device according to claim 1, wherein the elements and the ring are not directly connected to each other.

3. The device according to claim 1, wherein the ring is provided with spaced apart blocks of ferromagnetic material and forms part of the generator.

4. The device according to claim 1, wherein the ring is configured to mechanically transmit forces.

5. The device according to claim 4, wherein the ring is configured to interact with a gear wheel or a toothed rack.

6. The device according to claim 1, wherein the elements and/or the device are or is mounted on rollers or water.

7. The device according to claim 1, further comprising a rail mounted on a scaffold, the rail bearing the elements.

8. The device according to claim 1, further comprising a separate support for each element.

9. The device according to claim 8, wherein the support is a carriage having at least two wheels.

10. The device according to claim 8, wherein the connection is formed between the supports of the elements and the ring.

11. The device according to claim 1, wherein the elements are elastically connected to each other.

12. The device according to claim 1, wherein the elements and/or the device are of modular construction.

13. The device according to claim 1, wherein the elements are formed by at least two element parts extending lengthwise above one another, the element parts being connected so that the element parts are tiltable by at most 2° relative to longitudinal axes of the element parts.

* * * * *